(12) United States Patent
Huth et al.

(10) Patent No.: US 11,801,725 B2
(45) Date of Patent: Oct. 31, 2023

(54) CONTROL DEVICE

(71) Applicant: HYDAC MOBILHYDRAULIK GMBH, Sulzbach/Saar (DE)

(72) Inventors: Heinz-Peter Huth, Überherrn (DE); Johannes Merscher, Heusweiler (DE)

(73) Assignee: HYDAC MOBILHYDRAULIK GMBH, Sulzbach/Saar (DE)

( * ) Notice: Subject to any disclaimer, the term of this patent is extended or adjusted under 35 U.S.C. 154(b) by 0 days.

(21) Appl. No.: 17/801,927

(22) PCT Filed: Feb. 23, 2021

(86) PCT No.: PCT/EP2021/054449
§ 371 (c)(1),
(2) Date: Aug. 24, 2022

(87) PCT Pub. No.: WO2021/180463
PCT Pub. Date: Sep. 16, 2021

(65) Prior Publication Data
US 2023/0089947 A1 Mar. 23, 2023

(30) Foreign Application Priority Data
Mar. 13, 2020 (DE) ............ 10 2020 001 713.4

(51) Int. Cl.
*B60G 17/056* (2006.01)
*B60G 11/26* (2006.01)
(Continued)

(52) U.S. Cl.
CPC .......... *B60G 17/056* (2013.01); *B60G 11/265* (2013.01); *B60G 21/067* (2013.01);
(Continued)

(58) Field of Classification Search
CPC .............. B60G 17/0432; B60G 17/005; B60G 17/056; B60G 21/073; B60G 11/265;
(Continued)

(56) References Cited

U.S. PATENT DOCUMENTS 3,667,227 A * 6/1972 Bentkowsky ....... F15B 11/0445
60/487
3,687,227 A * 8/1972 Reuter ................. B60G 17/005
180/41

(Continued)

FOREIGN PATENT DOCUMENTS

CH 660637 A5 * 5/1987
DE 41 38 208 5/1993
(Continued)

OTHER PUBLICATIONS

Koch, Arrangement for a Hydraulic Servocontrol, May 15, 1987, EPO, CH 660637 A5, Machine Translation of Description (Year: 1987).*

(Continued)

*Primary Examiner* — Paul N Dickson
*Assistant Examiner* — Matthew D Lee
(74) *Attorney, Agent, or Firm* — WENDEROTH, LIND & PONACK, L.L.P.

(57) ABSTRACT

A control device for an oscillating axle suspension, in particular a front axle suspension, includes at least of one hydraulic accumulator device (10), a suspension device (12) and a proportional valve (14) having a valve piston (26). The proportional valve (14) is connected to the accumulator and suspension devices (10, 12) via fluid ports (16, 18, 20, 22). The valve piston (26) is actuatable by an electric motor (28), is longitudinally guided in a valve housing (24) of the proportional valve (14) and controls the fluid ports (16, 18, 20, 22) such that, in at least one functional position of the (Continued)

valve piston (26), the axle oscillation is provided while the suspension is blocked and, in at least one further second functional position of the valve piston (26), the suspension is provided while the axle oscillation is blocked.

18 Claims, 2 Drawing Sheets

(51) Int. Cl.
    *B60G 21/067*     (2006.01)
    *B60G 21/073*     (2006.01)
    *B60G 21/10*     (2006.01)

(52) U.S. Cl.
    CPC ......... *B60G 21/073* (2013.01); *B60G 21/106* (2013.01); *B60G 2202/154* (2013.01); *B60G 2204/4605* (2013.01); *B60G 2204/82* (2013.01); *B60G 2204/8304* (2013.01); *B60G 2400/51* (2013.01)

(58) Field of Classification Search
    CPC ............... B60G 21/067; B60G 21/106; B60G 2202/154; B60G 2204/4605; B60G 2204/82; B60G 2204/8304; B60G 2400/51
    See application file for complete search history.

(56) References Cited

U.S. PATENT DOCUMENTS

| | | | |
|---|---|---|---|
| 3,835,647 A * | 9/1974 | Huffman | F15B 13/0422 60/486 |
| 4,099,733 A * | 7/1978 | Ahonen | B60G 17/033 180/21 |
| 5,271,632 A | 12/1993 | Glaser et al. | |
| 5,907,991 A * | 6/1999 | Ramamoorthy | E02F 9/2203 91/450 |
| 6,669,216 B1 * | 12/2003 | Elser | B60G 17/0432 280/124.159 |
| 7,055,831 B2 * | 6/2006 | Brandenburger | B60G 21/073 280/124.159 |
| 2001/0024021 A1 | 9/2001 | Allen et al. | |
| 2018/0080196 A1 * | 3/2018 | Kondo | E02F 9/2296 |
| 2018/0110213 A1 * | 4/2018 | Oberheide | A01M 7/0057 |
| 2018/0319239 A1 * | 11/2018 | Repela | B60G 17/0525 |

FOREIGN PATENT DOCUMENTS

| | | | |
|---|---|---|---|
| DE | 10317659 A1 * | 11/2004 | ............ E02F 9/123 |
| DE | 10 2004 040 636 | 2/2006 | |
| DE | 10 2014 113 998 | 3/2016 | |
| DE | 10 2015 015 685 | 6/2017 | |
| DE | 10 2017 004 531 | 11/2018 | |
| EP | 1174620 A2 * | 1/2002 | ............ F04B 49/002 |
| EP | 1 769 951 | 4/2007 | |
| EP | 3 590 740 | 1/2020 | |
| GB | 2564763 | 1/2019 | |
| GB | 2564763 A * | 1/2019 | ........... B60G 17/015 |
| WO | WO-2019007533 A1 * | 1/2019 | ............ B60G 11/26 |
| WO | WO-2023036701 A1 * | 3/2023 | ............ F04B 49/002 |

OTHER PUBLICATIONS

Koch, Arrangement for a Hydraulic Servocontrol, May 15, 1987, EPO, CH 660637 A5, Machine Translation of Description (Year: 1987) (Year: 1987).*

International Search Report (ISR) dated May 6, 2021 in International (PCT) Application No. PCT/EP2021/054449.

* cited by examiner

CONTROL DEVICE

FIELD OF THE INVENTION

The invention relates to a control device for an oscillating axle suspension, in particular a front axle suspension. The suspension comprises at least of one hydraulic accumulator device, a suspension device and a proportional valve having a valve piston. The proportional valve and the two devices are connected via fluid ports.

BACKGROUND OF THE INVENTION

From DE 10 2004 040 636 A1, a control device for a suspension device is known, in particular for vehicles subjected to changing load conditions. The vehicle has an axle suspension with
- at least one suspension cylinder, each cylinder having pressure chambers such as an annular chamber and a piston chamber,
- a load-sensing system to generate pressure,
- two supply lines forming main branches, between these spaces and a pump and a tank connection, wherein a valve is installed in every main branch, of which at least one valve is a pressure regulating valve, which is used to adjust the pressure of the respective predeterminable pressure chamber of the respective suspension cylinder, and
- a level regulating system.

The known solution can be used to set a different spring characteristic for the respective suspension cylinder by varying the pressure on the ring end. The spring characteristic can be defined from the outset as part of a conceptual design between operating limits for the spring characteristics.

The known axle suspension is not designed to oscillate, so that no roll stabilization is provided for such oscillating movements. Although front-axle suspension systems based on independent wheel suspensions have been implemented in practice, enabling oscillating operation of the front axle, and thus, also providing roll stabilization in conjunction with blocking and releasing the axle suspension, the known solutions require a large number of individual valves, however, that have to interact with one another in a sensible manner impairing functional reliability. Furthermore, owing to the large number of individual valve components used, the implementation of the known solutions is complex and therefore cost intensive.

Furthermore, DE 10 2015 015 685 A1 discloses a valve device having at least one valve piston disposed in a valve housing so as to be longitudinally movable along a travel axis by an electric motor. The piston at least partially connects or disconnects fluid ports disposed in the valve housing, such as a pressure supply port and two utility ports for a hydraulic load. The valve piston then can be actuated in a precise position within the valve housing for sensible operation via a conventional electric motor using an assignable computer unit when controlled appropriately.

BACKGROUND OF THE INVENTION

Based on this state of the art, the invention addresses the problem of further improving the known control device to the effect that an oscillating axle suspension, in particular front axle suspension, can be implemented using few components in a cost-effective manner, which axle suspension is also functionally reliable in use. A control device according to the invention solves such a problem in its entirety.

In accordance with the invention, the valve piston, actuatable by an electric motor, is longitudinally guided in a valve housing of the pilot valve and controls the fluid ports. In at least one functional position of the valve piston, the axle oscillation is active while the suspension is blocked. In at least one further second functional position of the valve piston, the suspension is active while the axle oscillation is blocked. Basically all the actuating operations necessary for the oscillation and springing of the axle suspension, including the blocking thereof, can be performed using only one single proportional valve, which can be actuated by the electric motor. This arrangement is without parallel in the prior art.

Owing to the proportional transition from the first functional position of the valve piston, in which the axle oscillates while the suspension is blocked, to the second functional position, in which the axle suspension is active while the oscillation is blocked, a pressure compensation between the hydraulic accumulator device and the suspension device is achieved. As a result, the first functional position of the valve piston can be formed "spool-tight" for the purpose of pressure compensation, without the need to provide devices for reducing the flow cross-section, such as nozzles, in a bypass. In addition, the proportionality of the valve permits variable damping of the suspension. Furthermore, the transitions between the individual functional positions are designed "harmoniously", so that undesirable, jerky movements of the associated working machine are prevented.

In a particularly preferred exemplary embodiment, provision is made in a further third functional position of the valve piston, for the axle oscillation and a pressure compensation occurring between the hydraulic accumulator device and the suspension device. As a result, damping of the suspension system can be achieved with simultaneous axle oscillation.

In a further preferred exemplary embodiment, provision is made for both the axle oscillation and the suspension occurring in a further fourth functional position of the valve piston.

In another preferred exemplary embodiment, provision is made in an optional, additional functional position, for proportional damping being provided for the suspension device while the axle oscillation is blocked.

In a further preferred exemplary embodiment, provision is made for the hydraulic accumulator device to be formed from two hydraulic accumulators, preferably of identical design. The fluid ends of the accumulators are each connected to a fluid port in the valve housing. For the valve piston to control the respective fluid-conveying connection to two further fluid ports in the valve housing, to each of which a suspension cylinder, preferably its piston end, of the suspension device is connected.

In a further preferred exemplary embodiment, provision is made for the valve housing to have two additional fluid ports, which can be controlled by the valve piston and which can be blocked in at least one of the functional positions, one of the additional fluid port is connected to the piston end of one suspension cylinder and the other additional fluid port is connected to the piston end of the other suspension cylinder. The design of the proportional valve using multi-port technology renders it particularly suitable for large volume flows.

In a further preferred exemplary embodiment, provision is made for the electric motor to act on a pinion gear of the valve piston via a gear disposed in a gear chamber. The valve piston, penetrated by a longitudinal duct, establishes pressure compensation between the gear chamber and a tank port or a return port in the valve housing. The pressure compensation permits the valve piston to be brought into its functional positions in a pressure-compensated manner, which valve piston can be moved by the electric motor via the pinion drive with a particularly high resolution in relation to the fluid ports.

In a further preferred exemplary embodiment, provision is made for the electric motor to be controlled by a computer unit, which receives at least sensor information from at least two pressure sensors. Each pressure sensor is installed in a fluid-conveying connection between the valve piston and the respective suspension cylinder and/or the valve piston and the respective hydraulic accumulator. The respective pressure sensor connected to the fluid connection between the valve piston and the respective suspension cylinder can be used to detect the cylinder pressure in this suspension cylinder, thereby indirectly determining the axle load. Such a pressure sensor and additionally an respective pressure sensor connected to the fluid connection between the valve piston and the respective hydraulic accumulator, which can be connected to this suspension cylinder by f the proportional valve, can be used to determine the differential pressure in the blocked state of the suspension for the purpose of checking or monitoring pressure compensation. This arrangement improves functional safety. The individual sensor can be part of the respective hydraulic accumulator or the respective suspension cylinder, in particular disposed therein.

Preferably, provision is also made for the electric motor to move the valve piston in two counter-directional directions of travel in the valve housing. This provision allows for a compact valve design.

Because preferably the electric motor and its gear housing are accommodated in a drive housing and are disposed on one end face of the valve housing free of fluid ports, the control device is designed to be particularly space-saving and can be connected to other control devices in a side-by-side arrangement to form control blocks.

For the actuation of the valve piston by f the electric motor, a control unit in the form of integrated electronics (On Board Electronics, OBE) can be provided on the valve, which, connected to a CAN bus, actuates the electric motor. Integrated electronics of this kind free up two power outputs on the controller and reduce the amount of assembly and wiring required. Furthermore, the power consumption for a traverse movement of the valve piston is low. In addition, the design of the actuating device of the valve spool allows for the valve spool to remain in its current functional position, for instance in a de-energized state of the actuating device, until it is brought into another position by f the electric motor, which proves to be favorable in terms of energy and which additionally improves the reliability of the control device.

Other objects, advantages and salient features of the present invention will become apparent from the following detailed description, which, taken in conjunction with the drawings, discloses preferred embodiments of the present invention.

BRIEF DESCRIPTION OF THE DRAWINGS

Referring to the drawings that form a part of this disclosure and that are a general representation and are not to scale.

DETAILED DESCRIPTION OF THE INVENTION

Figure 1:
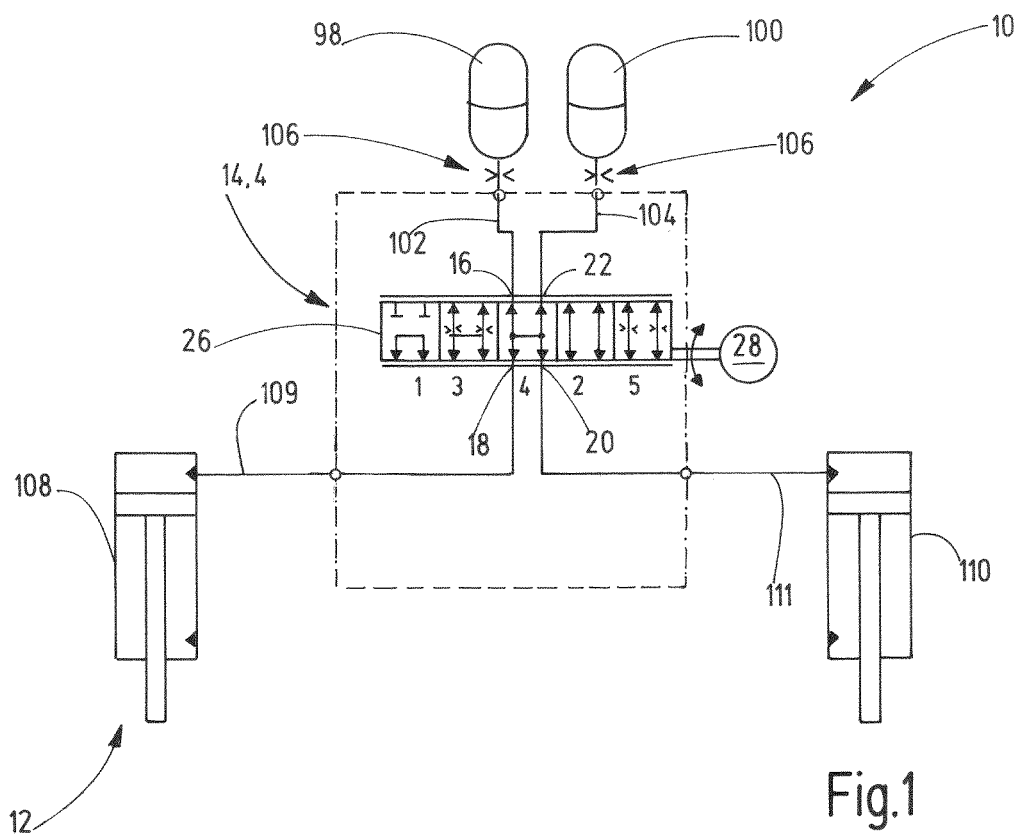
FIG. 1 is a hydraulic circuit diagram of a control device according to a first exemplary embodiment of the invention.
Figure 3:
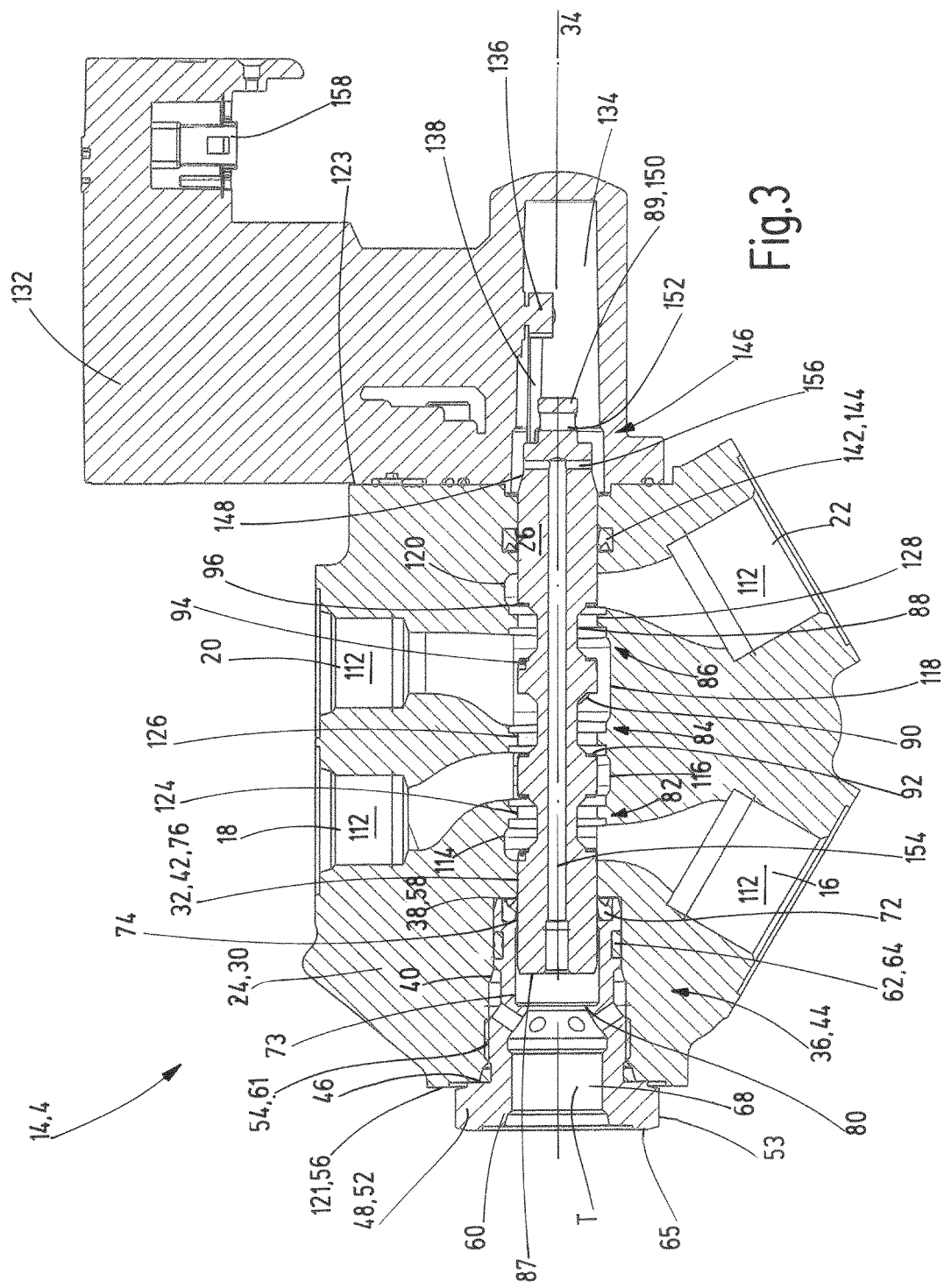
FIG. 3 is a side view in section through a proportional valve of the first exemplary embodiment of FIG. 1.

FIGS. 1 and 3 relate to a first exemplary embodiment of a control device according to the invention for an oscillating axle suspension in the form of a front axle suspension. The control device has a hydraulic accumulator device 10, a suspension device 12 and a proportional valve 14. The hydraulic accumulator device 10 and the suspension device 12 are connected to fluid ports 16, 18, 20, 22 of the proportional valve 14.

The proportional valve 14 has a valve housing 24, in which a valve piston 26 is guided in a longitudinally movable manner. The valve piston 26 can be operated by an electric motor 28 and controls the fluid ports 16, 18, 20, 22 in such a way that the axle oscillation is activated in a first functional position of the valve piston 26 while the suspension is blocked. The suspension is activated in a second functional position of the valve piston 26 while the axle oscillation is blocked.

Furthermore, the valve piston 26 controls the fluid ports 16, 18, 20, 22 in such a way that, in a third functional position of the valve piston 26, the axle oscillation is activated and a pressure between the hydraulic accumulator device 10 and the suspension device 12 is compensated. In addition, provision is made for a fourth functional position of the valve piston 26, in which both the axle oscillation and the suspension are activated. In addition, the valve piston 26 has a fifth functional position, in which the suspension device 12 is proportionally dampened while the axle oscillation is blocked.

The valve housing 24 has a main housing part 30, through which a passageway 32 extends and in which the valve piston 26 is guided for longitudinal travel along its longitudinal axis 34. At one end region 36, the passageway 32 of the main housing part 30 is widened in the inner diameter 42 in the direction away from the valve piston 26 to form a shoulder 38 and a tapered widening 40 subsequent to the shoulder 38.

The tapered widening 40 is provided in the central region of the passageway widening 44 between the shoulder 38 and one end 46 of the passageway 32 of the main housing part 30. In the area of the passageway widening 44 of the main housing part 30, the valve piston 26 is spaced apart from the main housing part 30.

An insert 48 is inserted into the passageway widening 44 as part of the valve housing 24. The insert 48 has a widening of its outer diameter in the direction facing away from the valve piston 26 matching the conical inner circumferential widening 40 of the passageway 32 of the main housing part 30. An end-sided annular projection 52 extends fully away from the end 60, facing away from the valve piston 26, of the insert 48 in the radial direction. The outer diameter 53 of the annular projection 52 of the insert 48 is larger than the largest inner diameter 42 of the passageway 32 of the main housing part 30. In a state, in which a threaded section 54 is used to secure the insert 48 to the main housing part 30, the annular projection 52 of the insert 48 is in contact with an outer wall 56 of the main housing part 30, and its end face 58, facing the valve piston 26, is in contact with the shoulder 38 of the passageway 32 of the main housing part 30. The threaded section 54 between the insert 48 and the main housing part 30 is provided, viewed in the axial direction, between the conical passageway widening 40 and the end 60, facing away from the valve piston 26, of the passageway 32 of the main housing part 30. An annular groove 62 is formed in the outer periphery 61 of the insert 48 between its end 58 facing the valve piston 26, and its central region. A sealing ring 64 is provided in the groove 62 and is in sealing contact with the main housing part 30.

The insert 48 has a tank or return port T on its side 65 facing away from the valve piston 26. From tank or return port T, a central fluid duct 68 extends through the insert 48 in the axial direction toward the valve piston 26. At the end 58, facing the valve piston 26, of the insert 48, the inner diameter 73 of the insert 48 is widened in a stepped manner to accommodate another sealing ring 72. A first annular inner diameter reduction 74 of the insert 48 for guiding the valve piston 26 has an inner diameter slightly larger than the outer diameter 76 of the valve piston 26 and adjoins the shoulder-shaped inner diameter widening of the fluid duct 68 in a direction towards the end projection 52 of the insert 48. Subsequently, with the interposition of an area having a larger constant inner diameter relative to the first diameter reduction 74, a second annular inner diameter reduction 80 of the insert 48 is provided as an end stop for the valve piston 26. The second annular inner diameter reduction 80 has a smaller inner diameter than the outer diameter 76 of the valve piston 26.

A first 82 annular recess, a second annular recess 84 and a third 86 annular recess are in the central region of the valve piston 26 and are spaced apart from one another in the axial direction, viewed from its end 87 facing the insert 48 in the direction of its end 89 facing away from the insert 48. Viewed in longitudinal section, each recess 82, 84, 86 is shaped as a trough or U-shaped. Thus, each recess 82, 84, 86 of the valve piston 26, as viewed in longitudinal section, has a base 88, from the ends of which an oblique side wall part 90 each, extending outwards in the axial direction and at the same time in the radial direction. A radial side wall part 92 extends from the oblique side wall part 90 only in the radial direction away. The transition of the respective radial side wall parts 92 of respective recesses 82, 84, 86 to the full or largest outer diameter 76 of the valve piston 26 forms a first control edge 94 and a second 96 control edge of this recess 82, 84, 86, viewed from its end 87 facing the insert 48, in the direction of its end 89 facing away from the insert 48.

A first fluid port 16 and a fourth 22 fluid port for the hydraulic accumulator device 10, as well as a second fluid port 18 and a third 20 fluid port for the suspension device 12, are provided at the valve housing 24. The fluid ports 16, 22 for the hydraulic accumulator device 10 and the fluid ports 18, 20 for the suspension device 12 can be intersected by a sectional plane shown in FIG. 3, in which sectional plane the longitudinal axis 34 of the valve piston 26 is located. The fluid ports 16, 22 for the hydraulic accumulator device 10 are disposed on one side of the longitudinal axis 34, and the fluid ports 18, 20 for the suspension device 12 are disposed on the other side of the longitudinal axis 34.

The hydraulic accumulator device 10 has two hydraulic accumulators 98, 100, which are of the same design. The fluid end of one hydraulic accumulator 98 is connected to the first fluid port 16 via a first fluid line 102. The fluid end of the other hydraulic accumulator 100 is connected to the fourth fluid port 22 via a fourth fluid line 104. One orifice 106 each is provided in the first fluid line 102 and the fourth 104 fluid line.

The suspension device 12 has two suspension cylinders 108, 110. The piston end of the first suspension cylinder 108 is connected to the second fluid port 18 via a second fluid line 109. The piston end of the other or second suspension cylinder 110 is connected to the third fluid port 20 via a third fluid line 111. the first suspension cylinder 108 is used to suspend one wheel of the front axle. The second suspension cylinder 110 is used to suspend the other wheel of the front axle.

One fluid duct 112 each extends from every fluid port 16, 18, 20, 22, respectively, through the valve housing 24 towards the valve piston 26 and discharges respectively into a first control chamber 114, second control chamber 116, third control chamber 118, and fourth control chamber 120 in the valve housing 24, viewed from the end 56 of the valve housing 24 with the insert 48 towards its end 123 facing away from the insert 48. Specifically, the first fluid port 16 is connected to the first control chamber 114 in a fluid-conveying manner, the second fluid port 18 is connected to the second control chamber 116 in a fluid-conveying manner, the third fluid port 20 is connected to the third control chamber 118 in a fluid-conveying manner, and the fourth fluid port 22 is connected to the fourth control chamber 120 in a fluid-conveying manner. Every control chamber 114, 116, 118, 120 is disposed, as part of the passageway 32 through the valve housing 24, coaxially with the longitudinal axis 34 of the valve piston 26 and has an inner diameter larger than the inner diameter 42 of the guide parts 124, 126, 128 of the passageway 32 for guiding the valve piston 26, The guide parts 124, 126, 128 are each provided in particular between two adjacent control chambers 114, 116, 118, 120. In that way, the valve piston 26 extends through each of the control chambers 114, 116, 118, 120.

To the valve housing 24 on the end 123 having no fluid ports and facing away from the insert 48 a drive housing 132 adjoins. The electric motor 28 is disposed in the drive housing in such a way that a fictitious extension of the motor drive axis perpendicularly intersects the longitudinal axis 34 of the valve piston 26. A gear chamber 134 is provided in the drive housing 132. In the gear chamber 134, a drive pinion 136 can be driven by the electric motor 28 and meshes with a rack 138 of the valve piston 26. The rack 138 is attached to the end region 146 facing away from the insert 48, of the valve piston 26 and extends axially away from the valve piston 26 into the gear chamber 134. The drive pinion 136 and the rack 138 in conjunction form a pinion drive.

The drive shaft of the electric motor 28 is operatively connected to the drive pinion 136 via a planetary gear, which is provided in a gear housing (not shown in the figures) disposed in the drive housing 132. The gear housing is arranged between the electric motor 28 and the drive pinion 136. Such planetary gears are known from the prior art. In this regard, reference is made to DE 10 2015 015 685 A1.

The electric motor 28 can be used to move the valve piston 26 in two directions of travel in the valve housing 24, which directions are opposite to each other.

Between the fourth control chamber 120 and the end 123 facing the drive housing 132, of the valve housing 24, the inner diameter 42 of the passageway 32 is widened to form an annular groove 142, in which another sealing ring 144 is provided. At its end region 146 facing the drive housing 132, the outer diameter 76 of the valve piston 26 is reduced in the direction of the drive housing 132 while forming a tapered diameter reduction 148. An extension 150 is formed on the end 89, facing the drive housing 132, of the valve piston 26, which extension 150 has a further passageway 152 extending perpendicular to the longitudinal axis 34 of the valve piston 26. The further passageway 152 is used to engage an operating part of an emergency operating device (not shown in the figures). Such emergency operating devices are known from the prior art. In this regard, reference is made to DE 10 2015 015 685 A1.

A central longitudinal channel 154 extends through the valve piston 26, starting from its end 87 facing the insert 48, in the direction of the drive housing 132. The longitudinal channel 154 merges into a transverse channel 156 in the valve piston end region 146 facing the drive housing 132 and reduced in outer diameter 76 of the valve piston 26. The two ends of the transverse channel 156 open out of the valve piston 26 into the gear chamber 134 in this region 146. The gear chamber 134 is connected to the tank port or the return port T in a fluid-conveying manner via the duct routing 154, 156 in the valve piston 26 and via the fluid duct 68 in the insert 48, for the purpose of establishing pressure compensation.

A pressure sensor (not shown in the figures) is connected to each of the fluid-conveying connections 112, 109, 111 between the valve piston 26 and the respective suspension cylinders 108, 110. The sensor information acquired by the pressure sensors is fed to a computing unit (not shown in the figures), which is provided in the drive housing 132 in the sense of integrated electronics and by which the electric motor 28 can be controlled. The drive housing 132 comprises a connector part 158 for powering the computing unit and the electric motor 28 and for transmitting control commands to the computing unit.

In the fourth functional position 4 of the proportional valve 14 shown in FIG. 3, viewed in the axial direction, the guide part 124 is disposed between the first control chamber 114 and the second control chamber 116 in the area of the base 88 of the first recess 82. The guide part 126 is disposed between the second control chamber 116 and the third control chamber 118 in the area of the base 88 of the second recess 84. The guide part 128 is disposed between the third control chamber 118 and the fourth control chamber 120 in the area of the base 88 of the third recess 86. This arrangement permits a fluid-conveying connection free from constrictions of the flow cross-section from every hydraulic accumulator 98 or suspension cylinder 108 to any other hydraulic accumulator 100 or suspension cylinder 110. In this travel position of the valve piston 26, both the axle oscillation and the suspension are activated.

In the first functional position of the proportional valve 14, the valve piston 26 is moved to its one end position towards the insert 48, in which end position the valve piston 26 is in contact with the second annular inner diameter reduction 80 of the insert 48. In this travel position, the guide part 124 of the passageway 32 between the first control chamber 114 and the second control chamber 116 is in guiding contact with the full outer diameter 76 of the valve piston 26 between its first recess 82 and second recess 84. Likewise, in this travel position, the guide part 128 is in guiding contact between the third control chamber 118 and fourth control chamber 120 with the full outer diameter 76 of the valve piston 26 at its end region 146 facing the drive housing 132. As a result, the respective fluid-conveying connections between the hydraulic accumulator device 10 and the suspension device 12 and between the hydraulic accumulators 98, 100 are blocked, thereby blocking the suspension. In addition, the base 88 of the second recess 84 of the valve piston 26, viewed in the axial direction, is disposed in the area of the guide part 126 between the second chamber 116 and the third control chamber 118, such that a fluid-conveying connection free from constrictions of the flow cross-section is established between the two suspension cylinders 108, 110 of the suspension device 12. This positioning enables the axle to oscillate while the suspension is blocked.

In the third functional position of the proportional valve 14, the full diameter 76 of the valve piston 26, viewed in the axial direction, is disposed between the first recess 82 and the second recess 84 slightly offset in the direction of the drive housing 132 relative to the guide part 124 between the first control chamber 114 and the second control chamber 116, such that this guide part 124 is located in the area of the sloping side wall 90 of the first recess 82. As a result, this guide part 124 forms an orifice with the adjacent second control edge 96 of the first recess 82. The orifice narrows the flow cross-section to and from the one hydraulic accumulator 98. Likewise, viewed in the axial direction, the full diameter 76 of the valve piston 26 at the end region 146 facing the drive housing 132 is slightly offset in the direction of the drive housing 132 from the guide part 128 between the third control chamber 118 and fourth control chamber 120. The guide part 128 is located in the area of the sloping side wall 90 of the third recess 86. As a result, this guide part 128 forms a further orifice with the adjacent second control edge 96 of the third recess 86. That orifice narrows the flow cross-section to and from the one hydraulic accumulator 100. This narrowing permits the pressure between the hydraulic accumulator device 10 and the suspension device 12 to be compensated. In addition, the guide part 126 is disposed between the second control chamber 116 and third control chamber 118, viewed in the axial direction, in the area of the base 88 of the second recess 84. This arrangement provides a fluid-conveying connection free from constrictions of the flow cross-section to and from every suspension cylinder 108, 110, permitting axle oscillation and pressure compensation between the hydraulic accumulator device 10 and the suspension device 12.

In the second functional position of the proportional valve 14, viewed in the axial direction, the guide part 124 is disposed between the first control chamber 114 and the second control chamber 116 in the area of the base 88 of the first recess 82. The guide part 126 between the second control chamber 116 and the third control chamber 118 is disposed in guiding contact with the full outer diameter 76 of the valve piston 26 between the first recess 82 and the second recess 84. The guide part 128 is disposed between the third control chamber 118 and the fourth control chamber 120 in the area of the base 88 of the third recess 86. As a result, a fluid-conveying connection free from constrictions of the flow cross-section is established between the one suspension cylinder 108 and the one hydraulic accumulator 98, and a further fluid-conveying connection free from constrictions of the flow cross-section is established between the other suspension cylinder 110 and the other hydraulic accumulator 100. The fluid-conveying connection and the further fluid-conveying connection are separate from each other. This positioning activates the suspension while the axle oscillation is blocked.

In the fifth additional functional position of the proportional valve 14, the full diameter 76 of the valve piston 26, viewed in the axial direction, is disposed at its end area facing the insert 48 slightly offset in the direction of the insert 48 relative to the guide part 124 between the first control chamber 114 and the second control chamber 116, such that this guide part 124 is located in the area of the sloping side wall 90 of the first recess 82. As a result, this guide part 126 forms an orifice with the adjacent first control edge 94 of the first recess 82. That orifice narrows the flow cross-section to and from the one hydraulic accumulator 98 that is connected to the one suspension cylinder 108 via the orifice in a fluid-conveying manner. Likewise, viewed in the axial direction, the full diameter 76 of the valve piston 26 between the second recess 84 and third recess 86 is slightly offset from the guide part 128 between the third control chamber 118 and the fourth control chamber 120 in the direction of the insert 48. That guide part 128 is located in the area of the sloping side wall 90 of the third recess 86. As a result, this guide part 128 forms a further orifice with the adjacent first control edge 94 of the third recess 86. That further orifice narrows the flow cross-section to and from the further hydraulic accumulator 100 that is connected to the other suspension cylinder 110 via the further orifice in a fluid-conveying manner. The orifice and the further orifice have a damping effect in the respective fluid connection. In addition, the guide part 126 between the second control chamber 116 and the third control chamber 118 is in leading contact, viewed in the axial direction, with the full outer diameter 76 of the valve piston 26 between the first recess 82 and second recess 84. As a result, the fluid-conveying connection between one hydraulic accumulator 98 and one suspension cylinder 108 is separated from the further fluid-conveying connection between the other hydraulic accumulator 100 and the other suspension cylinder 110. This positioning activates proportional damping of the suspension while axle oscillation is blocked.

An adjustable stop device (not shown in the figures) for the valve piston 26 may be provided in the drive housing 132 to limit the maximum stroke of the valve piston 26. In addition, control grooves (not shown in the figures) can be inserted in the areas where the outer circumference of the valve piston has its full outer diameter 76, which control grooves extend away from its respective recess 82, 84, 86 in the axial direction, in particular tapering in a wedge shape. Such a stop device and such control grooves are known from the prior art. In this regard, reference is made to DE 10 2017 004 531 A1.

Figure 2:
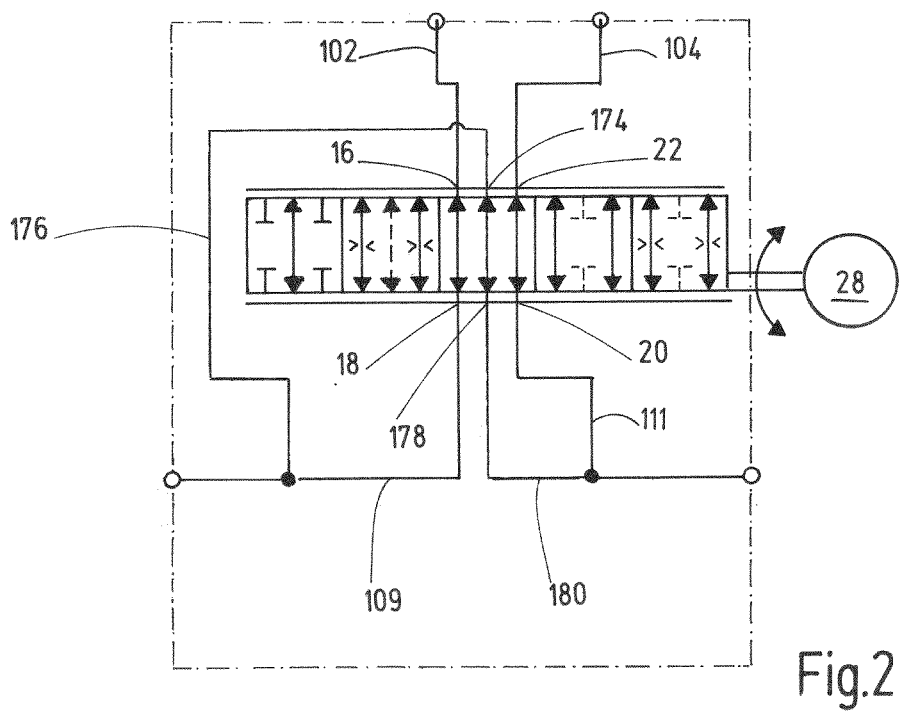
FIG. 2 is a hydraulic circuit diagram of a control device according to a second exemplary embodiment of the invention.

FIG. 2 shows a second exemplary embodiment of the control device according to the invention, which differs from the first exemplary embodiment shown in FIGS. 1 and 3 only as explained below:

In the second exemplary embodiment, the valve housing 24 has two additional fluid ports 174, 176 that can be controlled by the valve piston 26. The piston end of one suspension cylinder 108 is connected to the one additional fluid port 174 via a fifth fluid line 176, and the piston end of the other suspension cylinder 110 is connected to the other additional fluid port 178 via a sixth fluid line 180. In its first, its second and third functional positions, the valve piston 26 connects the two additional fluid ports 174, 178 with each other, whereas in its fourth and fifth functional positions, the valve piston 26 separates the two additional fluid ports 174, 178.

The fluid-conveying connection or separation between the additional fluid ports 174, 178 of the second exemplary embodiment established by the valve piston 26 in this way replaces the fluid-conveying connection between the one hydraulic accumulator 98 and the other hydraulic accumulator 100 or between the one suspension cylinder 108 and the other suspension cylinder 110 of the first exemplary embodiment. With respect to the fluid-conveying connection between the one hydraulic accumulator 98 and the one suspension cylinder 108, and the further fluid-conveying connection between the other hydraulic accumulator 100 and the other suspension cylinder 110, the functional positions of the second exemplary embodiment are identical to those of the first embodiment.

While various embodiments have been chosen to illustrate the invention, it will be understood by those skilled in the art that various changes and modifications can be made therein without departing from the scope of the invention as defined in the claims.

The invention claimed is:

1. A control device for an oscillating axle suspension, comprising:
   a first hydraulic accumulator;
   a suspension; and
   a proportional valve having a valve piston and being connected to the first hydraulic accumulator and the suspension via fluid ports in a valve housing of the proportional valve, the valve piston being connected to and actuatable by an electric motor, being longitudinally guided in the valve housing of the proportional valve and controlling the fluid ports such that, in at least a first functional position of the valve piston in the valve housing an axle oscillation is provided while the suspension is blocked, in at least a second functional position of the valve piston in the valve housing the suspension is provided while the axle oscillation is blocked, and in a third functional position of the valve piston in the valve housing the axle oscillation and a pressure compensation are provided between the first hydraulic accumulator and the suspension.

2. The control device according to claim 1 wherein in a fourth functional position of the valve piston in the valve housing, both the axle oscillation and the suspension are provided.

3. The control device according to claim 2 wherein in a fifth functional position of the valve piston in the valve housing, a proportional damping is provided for the suspension while the axle oscillation is blocked.

4. The control device according to claim 1 wherein the first hydraulic accumulator and a second hydraulic accumulator comprise fluid ends connected to respective fluid ports in the valve housing; and the valve piston controls respective fluid-conveying connections to two respective fluid ports in the valve housing each connected to a suspension cylinder of the suspension.

5. The control device according to claim 4 wherein the first hydraulic accumulator and the second hydraulic accumulator have an identical design.

6. The control device according to claim 4 wherein piston end of each of the suspension cylinders is connected to the respective fluid ports.

7. The control device according to claim 1 wherein the valve housing has two additional fluid ports controlled by the valve piston and being blocked in at least one of the functional positions, in the one of the functional positions the additional fluid ports being connected to a piston end of one suspension cylinder of the suspension and to a piston end of another suspension cylinder of the suspension.

8. The control device according to claim 1 wherein the electric motor acts on a pinion gear of the valve piston via a gear disposed in a gear chamber, the valve piston being penetrated by a longitudinal duct that establishes pressure compensation between the gear chamber and a tank or return port in the valve housing.

9. The control device according to claim 1 wherein the electric motor is controllable by a computer unit that receives at least sensor information from at least two pressure sensors, the sensors being installed in fluid-conveying connections between the valve piston and a suspension cylinder of the suspension and between the valve piston and the first hydraulic accumulator, respectively.

10. The control device according to claim 1 wherein the electric motor moves the valve piston in two counter-directional directions of travel in the valve housing.

11. The control device according to claim 1 wherein the electric motor and a gear housing therefor are accommodated in a drive housing and are disposed on one end face of the valve housing, the end face being free of fluid ports.

12. The control device according to claim 1 wherein the valve piston remains in a current one of the functional positions until the valve piston is brought into another one of the functional positions by the electric motor.

13. A control device for an oscillating axle suspension, comprising:
a first hydraulic accumulator;
a suspension; and
a proportional valve having a valve piston and being connected to the first hydraulic accumulator and the suspension via fluid ports in a valve housing of the proportional valve, the valve piston being connected to and actuatable by an electric motor, being longitudinally guided in the valve housing of the proportional valve and controlling the fluid ports such that, in at least a first functional position of the valve piston in the valve housing an axle oscillation is provided while the suspension is blocked, in at least a second functional position of the valve piston in the valve housing the suspension is provided while the axle oscillation is blocked, and in at least a fourth functional position of the valve piston in the valve housing both the axle oscillation and the suspension.

14. The control device according to claim 13 wherein in a fifth functional position of the valve piston in the valve housing, a proportional damping is provided for the suspension while the axle oscillation is blocked.

15. A control device for an oscillating axle suspension, comprising:
a first hydraulic accumulator;
a suspension; and
a proportional valve having a valve piston and being connected to the first hydraulic accumulator and the suspension via fluid ports in a valve housing of the proportional valve, the valve piston being connected to and actuatable by an electric motor, being longitudinally guided in the valve housing of the proportional valve and controlling the fluid ports such that, in at least a first functional position of the valve piston in the valve housing an axle oscillation is provided while the suspension is blocked, in at least a second functional position of the valve piston in the valve housing the suspension is provided while the axle oscillation is blocked, and in at least a fifth functional position of the valve piston in the valve housing a proportional damping is provided for the suspension while the axle oscillation is blocked.

16. A control device for an oscillating axle suspension, comprising:
a first hydraulic accumulator;
a suspension; and
a proportional valve having a valve piston and being connected to the first hydraulic accumulator and the suspension via fluid ports in a valve housing of the proportional valve, the valve piston being connected to and actuatable by an electric motor, being longitudinally guided in the valve housing of the proportional valve and controlling the fluid ports such that, in at least a first functional position of the valve piston in the valve housing an axle oscillation is provided while the suspension is blocked, and in at least a second functional position of the valve piston in the valve housing the suspension is provided while the axle oscillation is blocked, the valve housing having two additional fluid ports controlled by the valve piston and being blocked in at least one of the functional positions, in the one of the functional positions the additional fluid ports being connected to a piston end of one suspension cylinder of the suspension and to a piston end of another suspension cylinder of the suspension.

17. A control device for an oscillating axle suspension, comprising:
a first hydraulic accumulator;
a suspension; and
a proportional valve having a valve piston and being connected to the first hydraulic accumulator and the suspension via fluid ports in a valve housing of the proportional valve, the valve piston being connected to and actuatable by an electric motor, being longitudinally guided in the valve housing of the proportional valve and controlling the fluid ports such that, in at least a first functional position of the valve piston in the valve housing an axle oscillation is provided while the suspension is blocked, and in at least a second functional position of the valve piston in the valve housing the suspension is provided while the axle oscillation is blocked, the electric motor acting on a pinion gear of the valve piston via a gear disposed in a gear chamber, the valve piston being penetrated by a longitudinal duct that establishes pressure compensation between the gear chamber and a tank or return port in the valve housing.

18. A control device for an oscillating axle suspension, comprising:
a first hydraulic accumulator;
a suspension; and
a proportional valve having a valve piston and being connected to the first hydraulic accumulator and the suspension via fluid ports in a valve housing of the proportional valve, the valve piston being connected to and actuatable by an electric motor, being longitudinally guided in the valve housing of the proportional valve and controlling the fluid ports such that, in at least a first functional position of the valve piston in the valve housing an axle oscillation is provided while the suspension is blocked, and in at least a second functional position of the valve piston in the valve housing the suspension is provided while the axle oscillation is blocked, the electric motor and a gear housing therefor being accommodated in a drive housing and being disposed on one end face of the valve housing, the end face being free of fluid ports.

* * * * *